United States Patent
Wang et al.

(10) Patent No.: US 8,527,537 B2
(45) Date of Patent: Sep. 3, 2013

(54) METHOD AND APPARATUS FOR PROVIDING COMMUNITY-BASED METADATA

(75) Inventors: Zhibing Wang, Beijing (CN); Yupeng Liao, Beijing (CN)

(73) Assignee: Hulu, LLC, Santa Monica, CA (US)

( * ) Notice: Subject to any disclaimer, the term of this patent is extended or adjusted under 35 U.S.C. 154(b) by 333 days.

(21) Appl. No.: 12/875,775

(22) Filed: Sep. 3, 2010

(65) Prior Publication Data

US 2010/0332527 A1 Dec. 30, 2010

Related U.S. Application Data

(63) Continuation-in-part of application No. 12/389,249, filed on Feb. 19, 2009.

(51) Int. Cl.
G06F 17/30 (2006.01)
(52) U.S. Cl.
USPC .......................................... 707/769
(58) Field of Classification Search
USPC ........................................ 707/769, 802, 916
See application file for complete search history.

(56) References Cited

U.S. PATENT DOCUMENTS

| | | | |
|---|---|---|---|
| 5,761,655 A | 6/1998 | Hoffman | |
| 5,832,494 A | 11/1998 | Egger et al. | |
| 5,892,536 A | 4/1999 | Logan et al. | |
| 5,986,692 A | 11/1999 | Logan et al. | |
| 6,088,455 A | 7/2000 | Logan et al. | |
| 6,931,451 B1 | 8/2005 | Logan et al. | |
| 7,055,166 B1 | 5/2006 | Logan et al. | |
| 7,058,376 B2 | 6/2006 | Logan et al. | |
| 2002/0033842 A1 | 3/2002 | Zetts | |
| 2002/0188621 A1 | 12/2002 | Flank et al. | |
| 2003/0163823 A1 | 8/2003 | Logan et al. | |
| 2004/0233233 A1* | 11/2004 | Salkind et al. ................ 345/719 |
| 2004/0255330 A1 | 12/2004 | Logan | |
| 2004/0255334 A1 | 12/2004 | Logan | |
| 2004/0255336 A1 | 12/2004 | Logan et al. | |
| 2004/0255340 A1 | 12/2004 | Logan | |

(Continued)

FOREIGN PATENT DOCUMENTS

| | | |
|---|---|---|
| EP | 1197020 | 3/2007 |
| GB | 2443959 | 5/2008 |

(Continued)

OTHER PUBLICATIONS

"Gotuit and Pixsy Raise the Bar on Video Search," http://www.gotuit.com/press/2008/0930_Pixsy.html, 3 pages, Sep. 30, 2008.

(Continued)

*Primary Examiner* — Thu-Nguyet Le
(74) *Attorney, Agent, or Firm* — Fountainhead Law Group P.C.

(57) ABSTRACT

A method and apparatus for providing community based metadata is disclosed. In one embodiment, the method comprises the steps of detecting an object in a frame of media program, transmitting first data comprising the frame of the media program having the detected object to display device for presentation to a user, receiving second data comprising user entered metadata associated with the identified object, tracking the object across proximate frames of the media program, associating the entered metadata with the object in at least one of the proximate frames of the media program, and storing the associated entered metadata.

42 Claims, 13 Drawing Sheets

(56) References Cited

U.S. PATENT DOCUMENTS

| | | |
|---|---|---|
| 2004/0268386 A1 | 12/2004 | Logan et al. |
| 2005/0005308 A1 | 1/2005 | Logan et al. |
| 2005/0044561 A1 | 2/2005 | McDonald |
| 2005/0047681 A1 | 3/2005 | Hori et al. |
| 2006/0015925 A1 | 1/2006 | Logan |
| 2006/0190808 A1 | 8/2006 | Balthaser |
| 2006/0280437 A1 | 12/2006 | Logan et al. |
| 2007/0044010 A1 | 2/2007 | Sull et al. |
| 2007/0112852 A1 | 5/2007 | Sorvari et al. |
| 2007/0239683 A1 | 10/2007 | Gallagher |
| 2008/0022230 A1 | 1/2008 | Ogawa et al. |
| 2008/0060001 A1 | 3/2008 | Logan et al. |
| 2008/0086688 A1 | 4/2008 | Chandratillake et al. |
| 2008/0189617 A1 | 8/2008 | Covell et al. |
| 2008/0209066 A1 | 8/2008 | Spio et al. |
| 2008/0270449 A1 | 10/2008 | Gossweiler et al. |
| 2009/0024927 A1 | 1/2009 | Schrock et al. |
| 2009/0092373 A1 | 4/2009 | Hiyama |
| 2009/0094279 A1 | 4/2009 | Carmeli et al. |
| 2010/0082585 A1 | 4/2010 | Barsook et al. |
| 2010/0106672 A1* | 4/2010 | Robson et al. .................. 706/50 |
| 2010/0158099 A1* | 6/2010 | Kalva et al. .............. 375/240.01 |
| 2010/0218228 A1* | 8/2010 | Walter .......................... 725/105 |

FOREIGN PATENT DOCUMENTS

| | | |
|---|---|---|
| WO | 0058940 | 10/2000 |
| WO | 2005003899 | 1/2005 |
| WO | 2007030621 | 3/2007 |
| WO | 2007030751 | 3/2007 |

OTHER PUBLICATIONS

"Gotuit Announces Integration with DoubleClick," http://www.gotuit.com/press/2008/1022_DoubleClick.htm., 1 page, Oct. 22, 2008.

"Gotuit Publishes White Paper: The Currency of Internet Video," http://www.gotuit.com/press/2008/1028_Whitepaper_CurrencyOfInternetVideo.html, 1 page, Oct. 28, 2008.

"The Currency of Internet Video: The Importance of Quality Metadata in Monetizing Internet Video," Gotuit White Paper, Oct. 2008, pp. 1-13.

International Search Report, PCT Application No. PCT/US2011/050402, mailed Jan. 4, 2012.

* cited by examiner

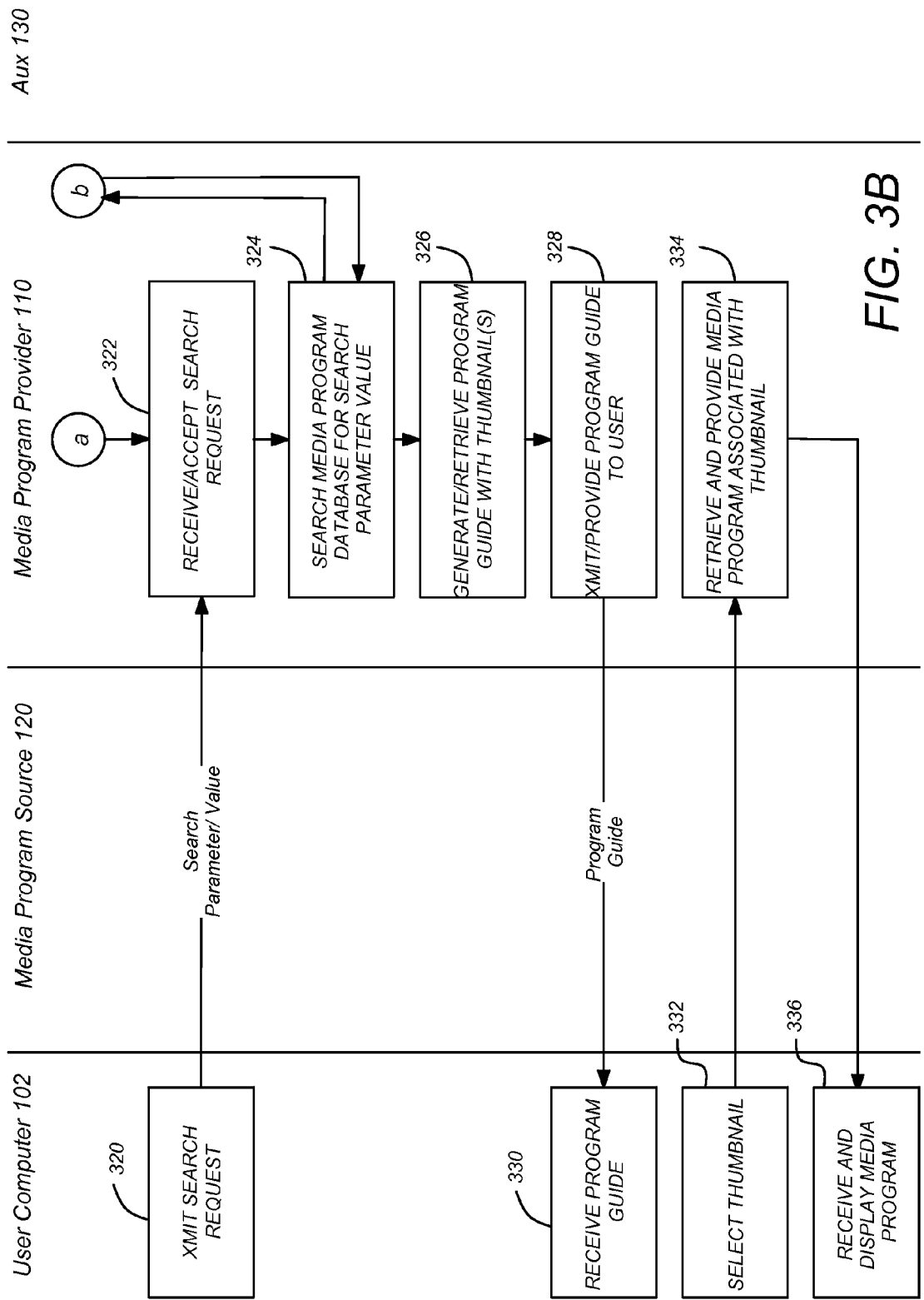

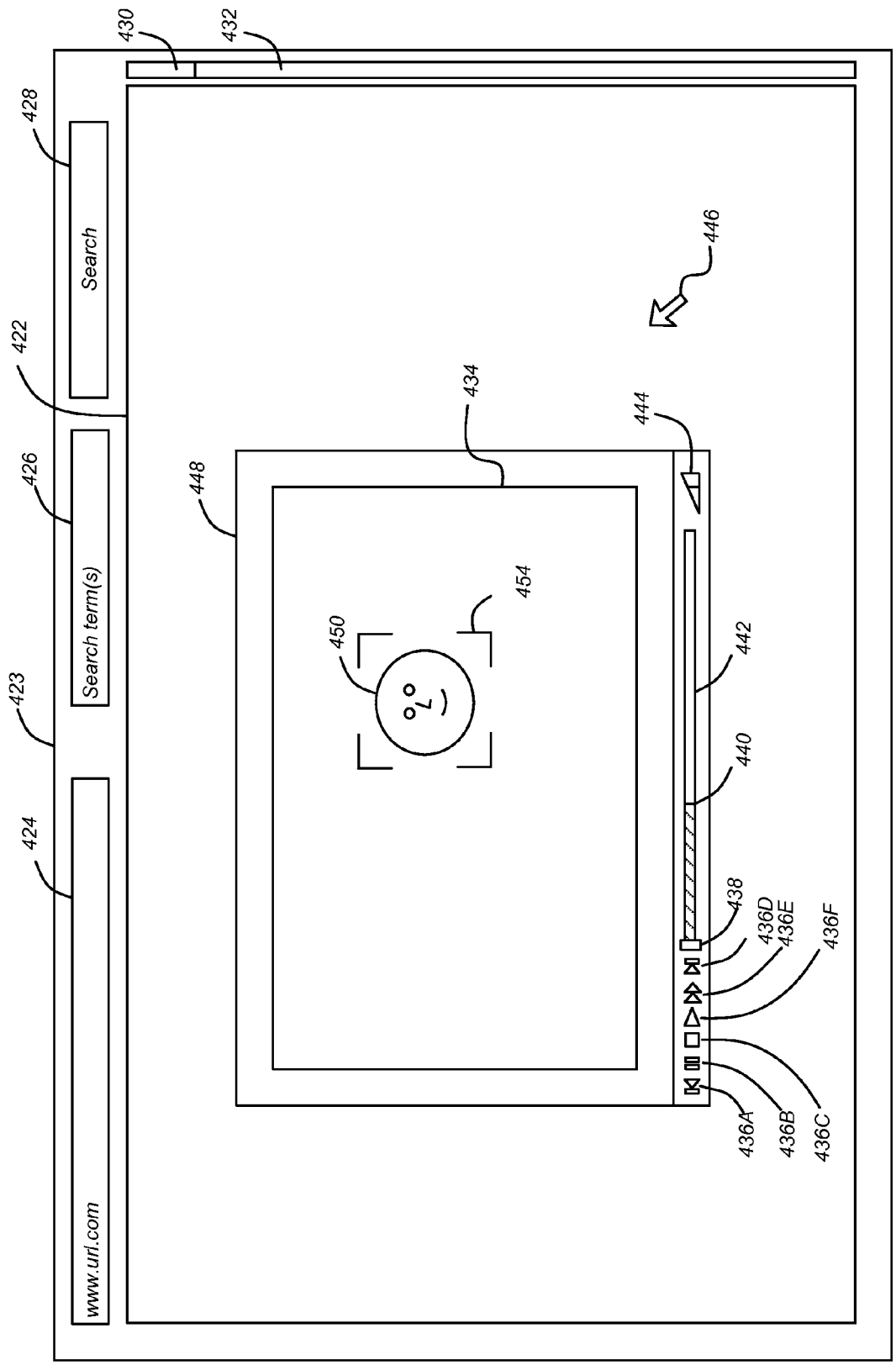

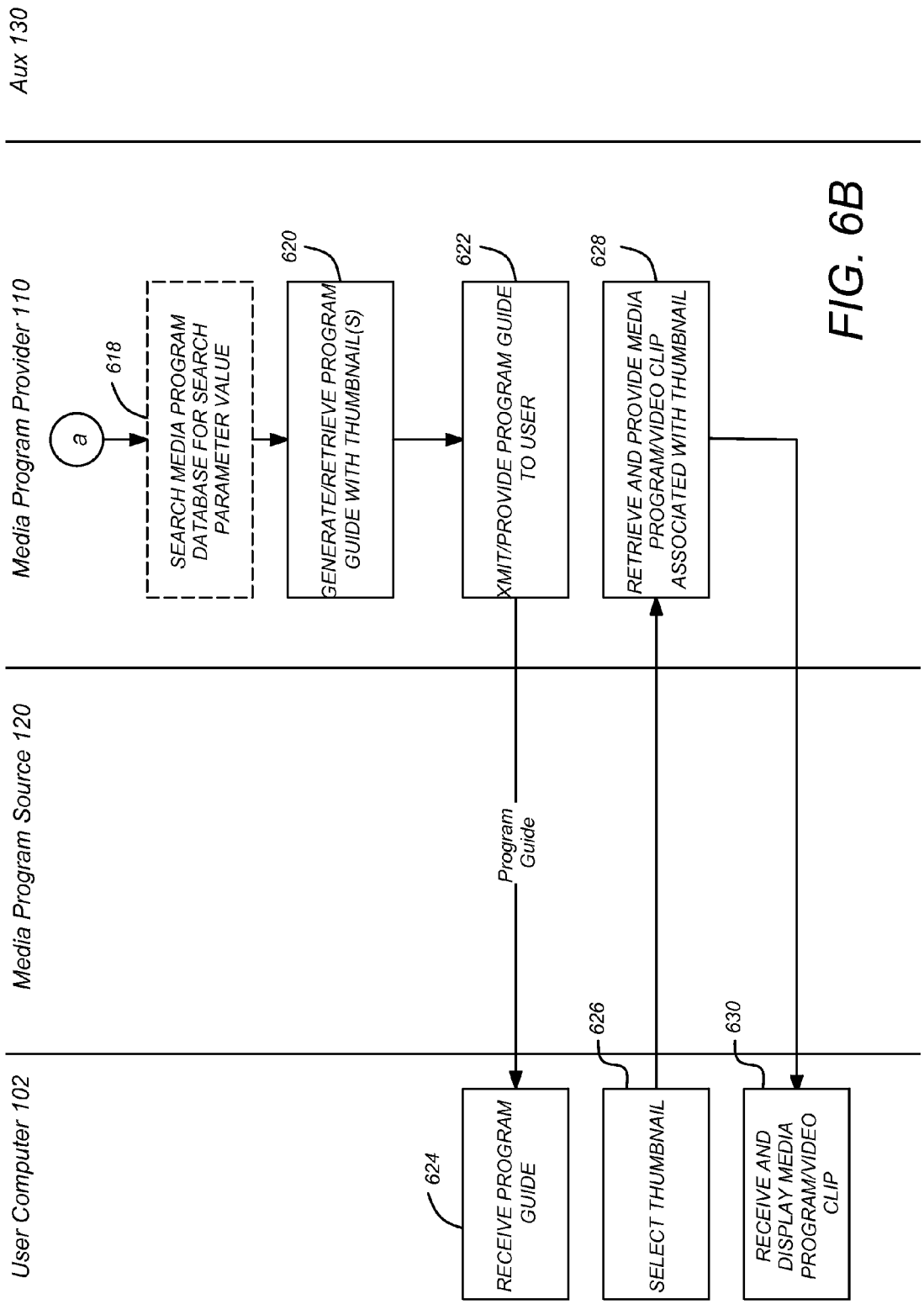

METHOD AND APPARATUS FOR PROVIDING COMMUNITY-BASED METADATA

CROSS REFERENCE TO RELATED APPLICATIONS

This application is a continuation-in-part (CIP) of U.S. patent application Ser. No. 12/389,249, entitled "METHOD AND APPARATUS FOR PROVIDING A PROGRAM GUIDE HAVING SEARCH PARAMETER THUMBNAILS," by Zhibing Wang et al., filed Feb. 19, 2009, which application is hereby incorporated by reference herein.

BACKGROUND OF THE INVENTION

1. Field of the Invention

The present invention relates to systems and methods for providing streaming media to users, and in particular, to a system and method for providing community-based metadata.

2. Description of the Related Art

The dissemination and playback of media programs has undergone substantial changes in the past decade. Previously, media programs were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, technology also permitted the dissemination and playback of media programs via the Internet, and with improved signal processing and more and more households with high-speed Internet access (e.g. DSL, fiber, satellite), this method of dissemination and playback has become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed internet connections. Simple downloading downloads the bytes of the media file in any convenient order, while progressive download downloads bytes at the beginning of a file and continues downloading the file sequentially and consecutively until the last byte. At any particular time during progressive downloading, portions of the file are not immediately available for playback. In some situations, the entire file must be downloaded first before a media player can start playback. In other situations, media players are able to start playback once enough of the beginning of the file has downloaded, however, the media player must download enough information to support some form of playback before playback can occur. Playback is often delayed by slow Internet connections and is also often choppy and/or contains a high likelihood of stopping after only a few seconds. Downloaded material is thereafter stored on the end-user computer.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media is delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is typically delivered from a few dedicated servers having high bandwidth capabilities.

On-demand streaming media services allow a broad spectrum of media programs to be made available to the user for immediate viewing. One of the challenges in providing on-demand streaming media services is to provide the user with an interface that allows the user to efficiently select which media program they would like to view. In the golden era of broadcast television, a small number of channels were available, and it was a simple matter for the user to simply check each channel or refer to a printed guide. The advent of satellite or cable television multiplied the number of such channels, and provided program guides similar to the printed schedules. However, the number of channels was still relatively limited. The storage capacity of DVRs is such that simple hierarchical menu interfaces permit the user to easily and quickly gain access to recorded programs. However, in the case of streaming video, the number of available media programs is virtually boundless. This raises the very real problem of how to provide useful program information about a very large number of media programs.

One way to provide the user with information about available media programs is to make use of metadata associated with the media programs. Such metadata may include factors such as the source of the media program, actors, genre (drama, comedy), target age group, and/or one or more thumbnails (small still video frames of the media program) of the media program. This metadata can then be used to assist the user in searching for the media program of interest or to assist the media program disseminator to organize the media programs in a way that conveniently allows the user to find the media program of interest.

A typical response to a search for media programs involving a particular performer (e.g. actor or actress), is to provide a textural list of such programs, along with other relevant information. The list may or may not include thumbnails of frames of the media program as well. Such thumbnails are typically a title page (showing the title of the media program) or a frame of the media program that is randomly chosen.

However, when responding to a search for media programs, thumbnails that show the title of the program or randomly chosen frames do not provide the user with useful information. What is far more useful in such instances is providing a thumbnail that is related to the search parameter that was provided. For example, if the user searches for media programs that have a particular actor, it is desirable for the program guide to present thumbnails that include a depiction of that performer. It would also be desirable for the program guide to present dynamically generated video clips that include a depiction of the performer.

Further, often, the user is interested not only in finding a particular program, but an object in a scene from a particular program. For example, the user may be interested in finding a media program in which a particular actor is portrayed in a particular scene.

Media program searches are provided in existing systems such as those available from GOOGLE and YOUTUBE. Such systems accept keyword searches, search media program metadata to identify media programs that may include images of the searched keywords. However, for each video provided in response to the search, the thumbnail that is provided is the same regardless of the search parameters or their values. For example, a search for the actress Meg Ryan may return a number of thumbnails, each representing a media program (and many of them only short clips) in which Meg Ryan is depicted. However, the thumbnail that is presented for each media program file is the same, regardless of the search parameter provided. That is because while each media program file may include metadata having the term "Meg Ryan," (indicating that Meg Ryan is depicted in at least part of the media program file), there is no metadata associated with individual frames of the media program file (indicating that she is depicted in the frame), nor does the metadata for the media program file indicate the frame(s) in which Meg Ryan is depicted.

For example, in the prior art, a particular media program file "When_Harry_Met_Sally" may include metadata describing the actors appearing in the media program, and those actors may include "Meg Ryan" and "Billy Crystal." The media program file "When_Harry_Met_Sally" may also be associated with a thumbnail image of one of the video frames that depicts the actress Meg Ryan. In such a case, when the user performs a keyword search using an "performer" search parameter having "Meg Ryan" as the value, the media program file "When_Harry_Met_Sally" may be presented, along with a thumbnail of a video frame that depicts the actress Meg Ryan. However, if the user were to perform a keyword search using the "performer" search parameter having the value "Billy Crystal", the user would be presented with the same program file "When_Harry_Met_ Sally", but the associated thumbnail would still depict the same video frame (that is, of Meg Ryan, not Billy Crystal). The user might also be presented with a different media program file (e.g. another media program file of "When_ Harry_Met_Sally" in which the associated thumbnail depicts Billy Crystal), but the thumbnail associated with the same media program file would still depict Meg Ryan, not Billy Crystal. Hence, the user is not presented with a "search aware" or "search responsive" thumbnail in which the thumbnail presented for a particular media program file depends on the value of the search parameter.

Randomly selected frames of the media program file may provide little or no information about the media program of interest, and may misrepresent its content. The thumbnail may also include an image that is not appropriate for general dissemination (e.g. an adult video). What is needed is a method and apparatus that provides search term-aware thumbnails of media program files.

The provision of search term-aware thumbnails can substantially increase the amount of metadata associated with a media program. For example, a media program may have a cast of perhaps ten noted performers, and for the metadata to indicate as such is reasonably trivial. However, when it is desired to have metadata associated with a large number of frames of the media program the task of generating the metadata and associating the metadata with each frame can become quite onerous. Further, in many instances, it is not clear what metadata might be of interest to viewers and what metadata is not. For example, a particular media program may include a performer in a cameo or extra role that was undertaken before the performer became famous. This sort of information would not ordinarily become part of the metadata when the media program is released, since the performer was not a notable performer at the time. However, after the media program's release, there may be a high level of interested in that performer. Further, in some cases, media programs include errors that can be amusing to viewers. Such errors are often discovered by viewers and not the producer of the media program.

What is needed is a method and apparatus that allows users to provide metadata about objects depicted in media programs that can be propagated to associated frames of the media program. The present invention satisfies that need.

SUMMARY OF THE INVENTION

To address the requirements described above, a method and apparatus for providing community based metadata is disclosed. In one embodiment, the method comprises the steps of detecting an object in a frame of media program, transmitting first data comprising the frame of the media program having the detected object to display device for presentation to a user, receiving second data comprising user entered metadata associated with the identified object, tracking the object across proximate frames of the media program, associating the entered metadata with the object in at least one of the proximate frames of the media program, and storing the associated entered metadata. In another embodiment, the invention is evidenced by an apparatus comprising a media program analyzer for detecting an object in a frame of media program and for tracking the object across proximate frames of the media program, a communication module for transmitting first data comprising the frame of the media program having the detected object to display device for presentation to a user, for receiving second data comprising user entered metadata associated with the identified object, and a database for associating the entered metadata with the object in at least one of the proximate frames of the media program, and for storing the associated entered metadata.

BRIEF DESCRIPTION OF THE DRAWINGS

Referring now to the drawings in which like reference numbers represent corresponding parts throughout:

FIGS. 3A and 3B are diagrams illustrating exemplary process steps that can be used to practice one embodiment;

FIGS. 4A-4F are diagrams illustrating exemplary method steps that can be used to develop metadata for a plurality of video frames FIGS. 6A and 6B are diagrams depicting the dynamic generation of thumbnails and/or video clips and thumbnail/video clip metadata in response to a user's search request.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
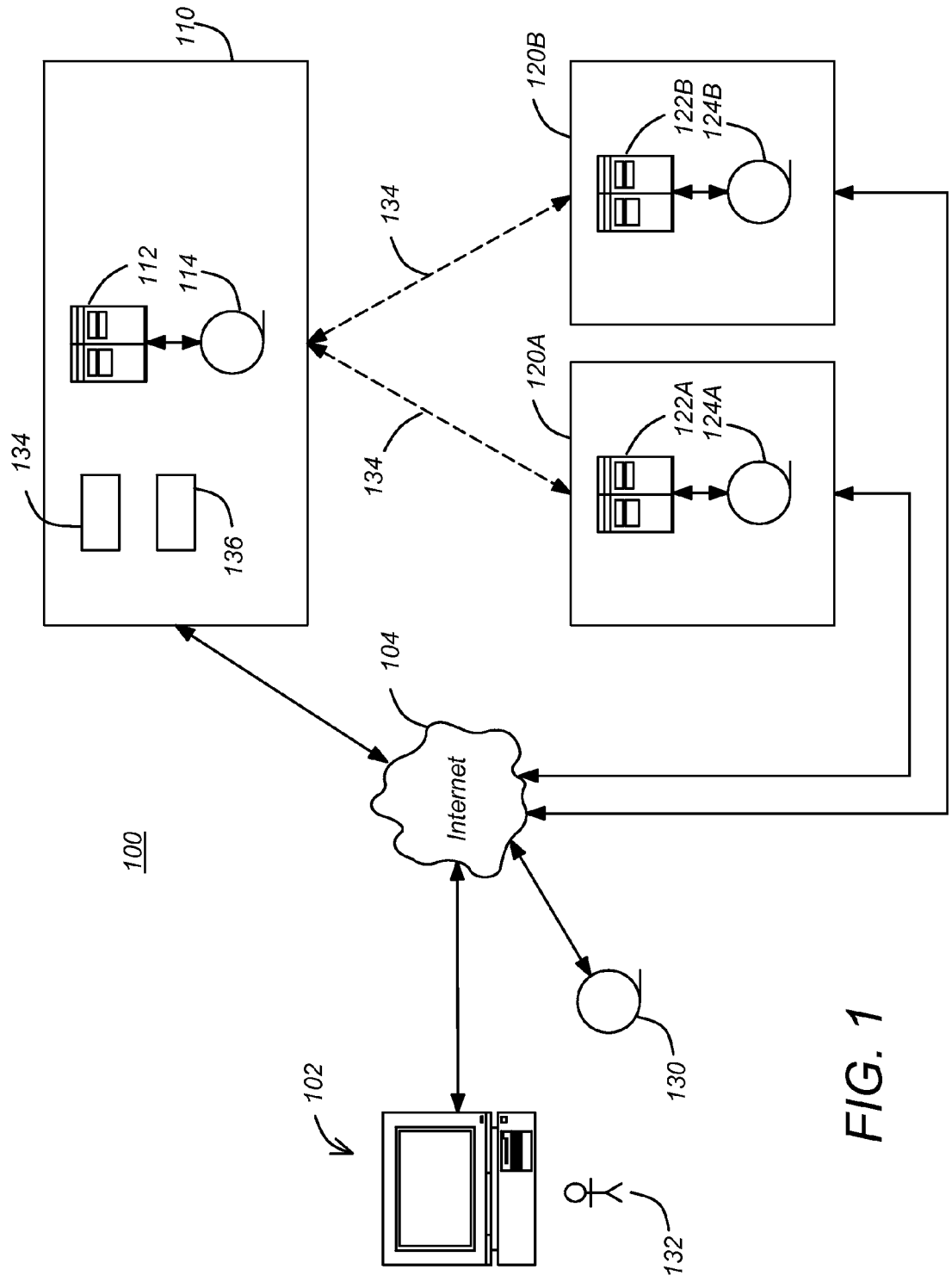
FIG. 1 is a diagram illustrating an exemplary media program system.

FIG. 1 is a diagram illustrating an exemplary media program system 100. In the illustrated embodiment, the system 100 comprises a one or more media program sources 120A, 120B, communicatively coupled to a communication network 104 such as the Internet and each having one or more source video servers 122A, 122B communicatively coupled to one or more source media program databases 124A, 124B. The media program system 100 further comprises and a media program provider 110, communicatively coupled to the communication network 104, and having one or more provider video servers 112 and a provider media program database 114. The media program provider 110 may include a media program analyzer for analyzing the media programs to identify and track objects as further described below and a communications module 136 for communicating with other entities. In one embodiment, the media program provider 110 is a video-on-demand and/or streaming media program provider.

The media program system 100 may stream media programs to a user computer 102 directly from the media program provider 110, or the media program provider 110 may operate as a portal, providing an interface to the media programs available from the media program sources 120A and 120B, but not the media program itself (which is instead provided by the media program source 120). The display device 102 may comprise a user computer such as a desktop or laptop computer, a personal data assistant (PDA), a cellphone, iPOD, iPHONE, iPAD, or any device with similar processing and display capabilities. Hereinafter, the display device 102 may alternatively be referred to as a user computer.

In the first case, the media program provider licenses media programs from the media program sources 120 (such as www.fox.com or www.nbc.com), and metadata for such programs is also typically provided as well. Such metadata is typically adequate (e.g. it need not be supplemented by information from other sources) and can be retrieved by the media program provider's database 114 for use.

In the second case (e.g. when direct streaming is not licensed), the media programs are streamed to the user's computer 102 directly from the servers of the media program source 120. When the media program is streamed directly from the media program source 120, it is often the case that the metadata provided by the media program source 120 is insufficient. In such cases, supplementary metadata may be obtained from independent media program source 130 (such as www.tv.com or www.imdb.com) or other third party sources. In this circumstance, the role of the media program provider 110 is that of a portal that provides users a list of available media programs and an interface to search to find such programs and to view them.

Media programs and metadata may be obtained via the communication network 104 or through auxiliary (and/or dedicated) communication links 134 by webcrawling (for example, using a program or automated script that browses the World Wide Web in a methodical, automated manner).

Using the computer 102, remote users 132 can communicate with the media program provider 110, to obtain media programs (including video-on-demand and/or streaming video services) and to search the provider media program database 114 to find media programs of interest.

Figure 2:
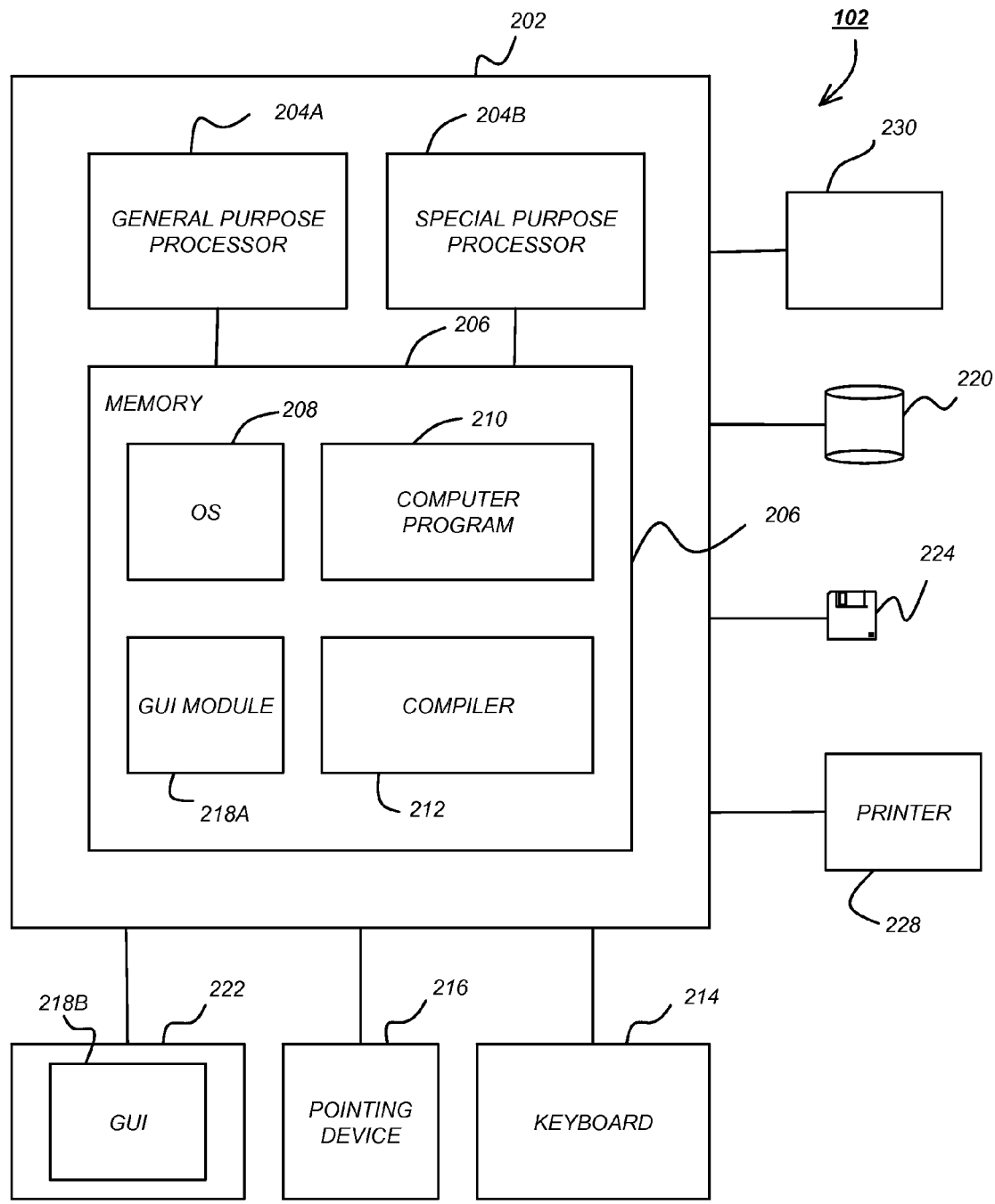
FIG. 2 illustrates an exemplary computer system that could be used to implement the present invention.

FIG. 2 illustrates an exemplary computer system 202 that could be used to implement elements the present invention, including the user computer 102 and the databases 114, 124. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208 to provide output and results.

Output/results may be presented on the display 222 or provided to another device for presentation or further processing or action. In one embodiment, the display 222 comprises a liquid crystal display (LCD) having a plurality of separately addressable liquid crystals. Each liquid crystal of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, the some or all of the computer program 210 instructions may be implemented via firmware instructions stored in a read only memory (ROM), a programmable read only memory (PROM) or flash memory in within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Figure 3A:
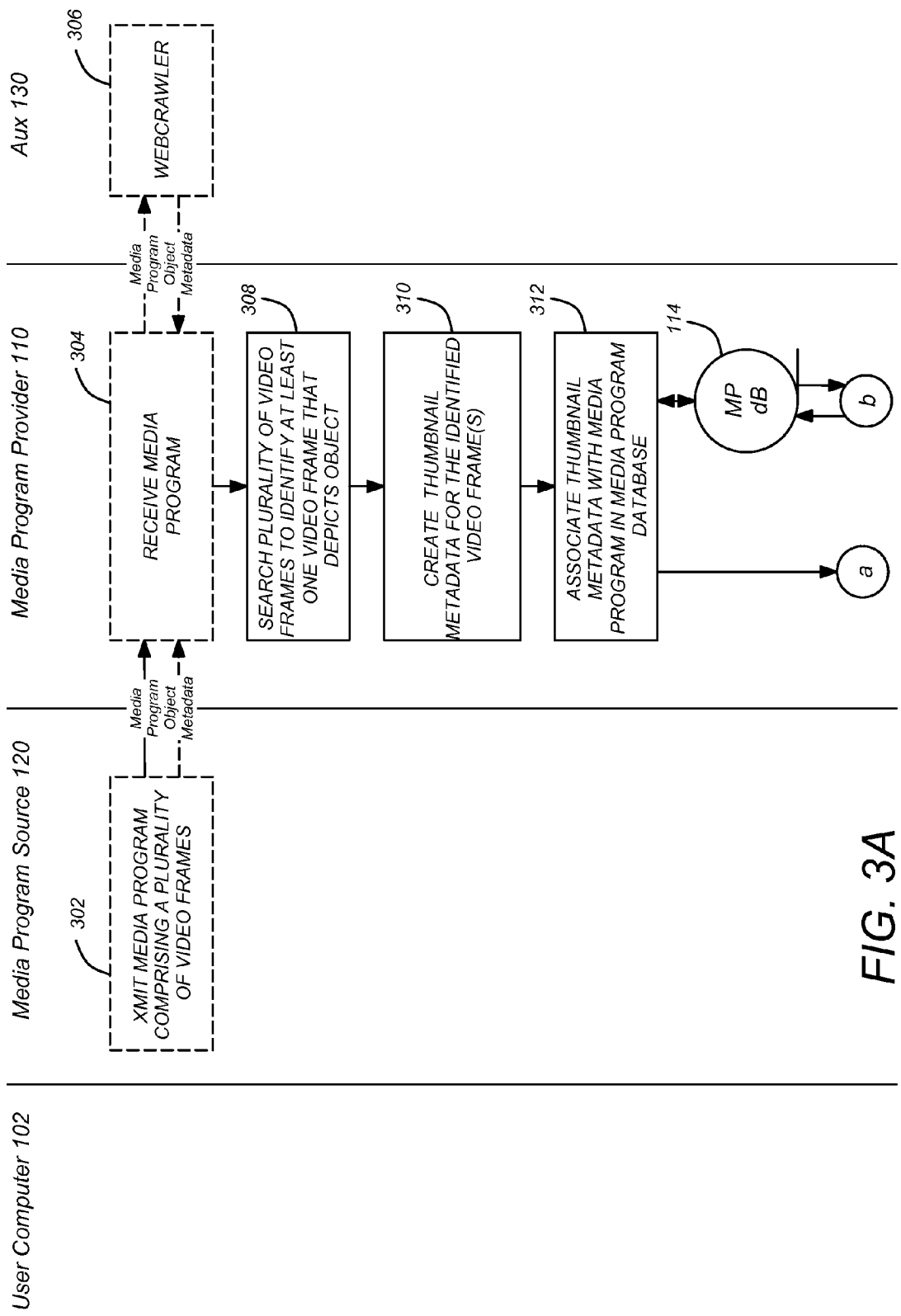

FIG. 3A is a diagram illustrating exemplary process steps that can be used to practice one embodiment of the present invention. As described above, the media program provider 110 may be the source of the media programs and the metadata that describes the media programs, or the media program provider 110 may obtain media programs and/or metadata about the media programs from media program sources 120 or independent media program metadata sources 130. In block 302, the media program is transmitted from a media program source 120 to the media program provider 110. The media program comprises a plurality of frames, each frame providing one of the images that together comprise the media program.

In addition to the media program, the media program source 120 may also transmit metadata about the media program. Such metadata may include general metadata about the media program itself and/or object metadata describing an object depicted in the media program. The media program and/or metadata is received by the media program provider 110, as shown in block 304. As shown in block 306, the media program provider 110 may also obtain metadata about media programs, including object metadata from independent media program metadata providers 130. Blocks 302 and 306 are dashed to indicate that they need not be performed in cases where the media program provider 110 already has the media program and any metadata necessary to complete the remainder of the operations depicted in FIGS. 3A and 3B. The media program may be transmitted from the media program source 120 to the media program provider 110 using the simple downloading, progressive downloading or streaming techniques described above.

In block 308, the plurality of frames of the media program are searched to identify at least one video frame that depicts an object. The object may be a performer, a building, or any object that is visually depicted in at least one of the frames of the media program. In the case where the media program is obtained from the media program source 120 by progressive downloading or streaming, the searching step may be accomplished by the media program provider 110 as the video data is received.

In one embodiment, the searching step is performed for one or more of the objects identified in the object metadata obtained from the media program source 120 or the independent media program metadata source 130. This operation can be accomplished as described further with respect to FIG. 4 as described below.

Metadata is created for the identified video frames, as shown in block 310. In one embodiment, the metadata is media program metadata that identifies the object and the frame(s) in which the object is found (e.g. object(s)=<object name(s)>, frame(s)=<frame number(s)>). In another embodiment, the metadata is associated with the frame (it is frame metadata) and is used to generate thumbnail metadata. In either case, the frame can be identified by a frame number(s), by elapsed time(s) in the media program, or analogous means for identifying the frame(s). The metadata (whether associated with entire media program or an individual frame of the metadata) can be then used to generate metadata for thumbnails (created from one of the identified individual frames).

The identified metadata is then associated with the media program in the media program database 114, as shown in block 312. In one embodiment, the media program is associated with metadata describing the objects depicted in the media program and the frame number(s) of the frames that depict the object(s). For example, a movie may be associated with metadata describing the performers portraying characters in the movie. In this case, the video frames are searched for frames in which the performers are depicted, metadata identifying the performers and the frame(s) they are depicted is generated, and associated with the media program. This process can be repeated for every object identified in the metadata (e.g. for every performer).

As described above, it can be difficult to perform the operation described in block 310, namely, to create metadata for a plurality of video frames. The present invention advantageously uses object detection and tracking functions, as well as metadata input from the viewing community to assist in the generation of this metadata and the association of the metadata with the appropriate frames or video clips.

Figure 4A:
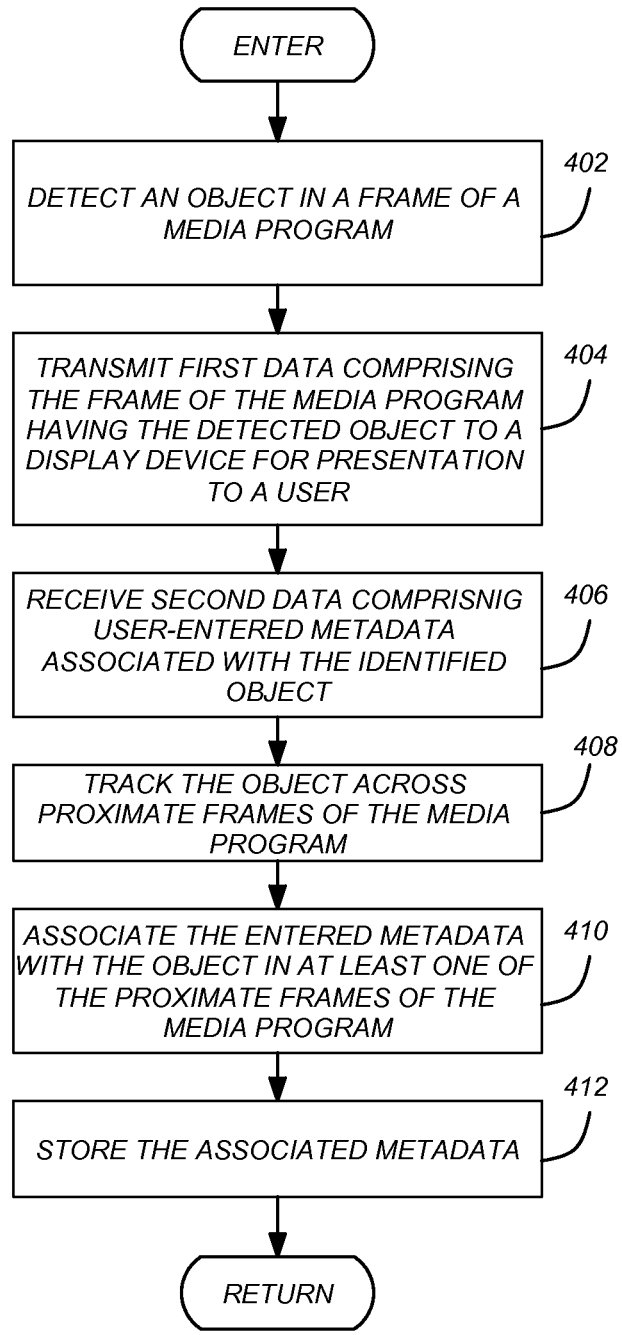
Figure 4C:
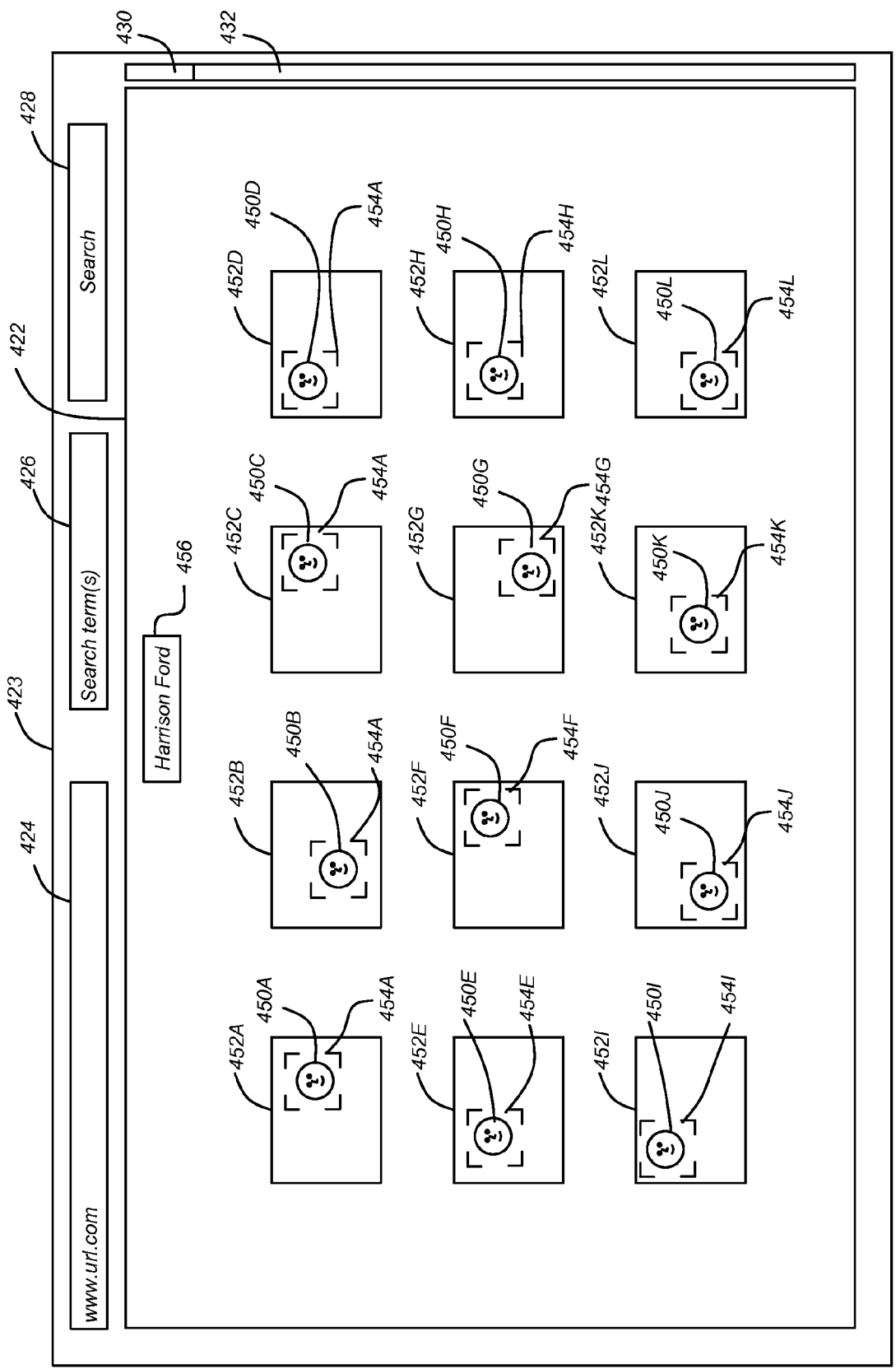
Figure 4D:
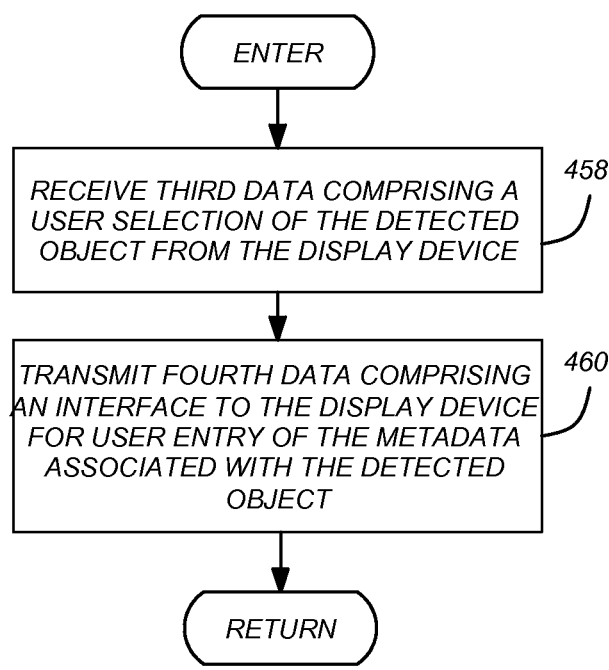
Figure 4E:
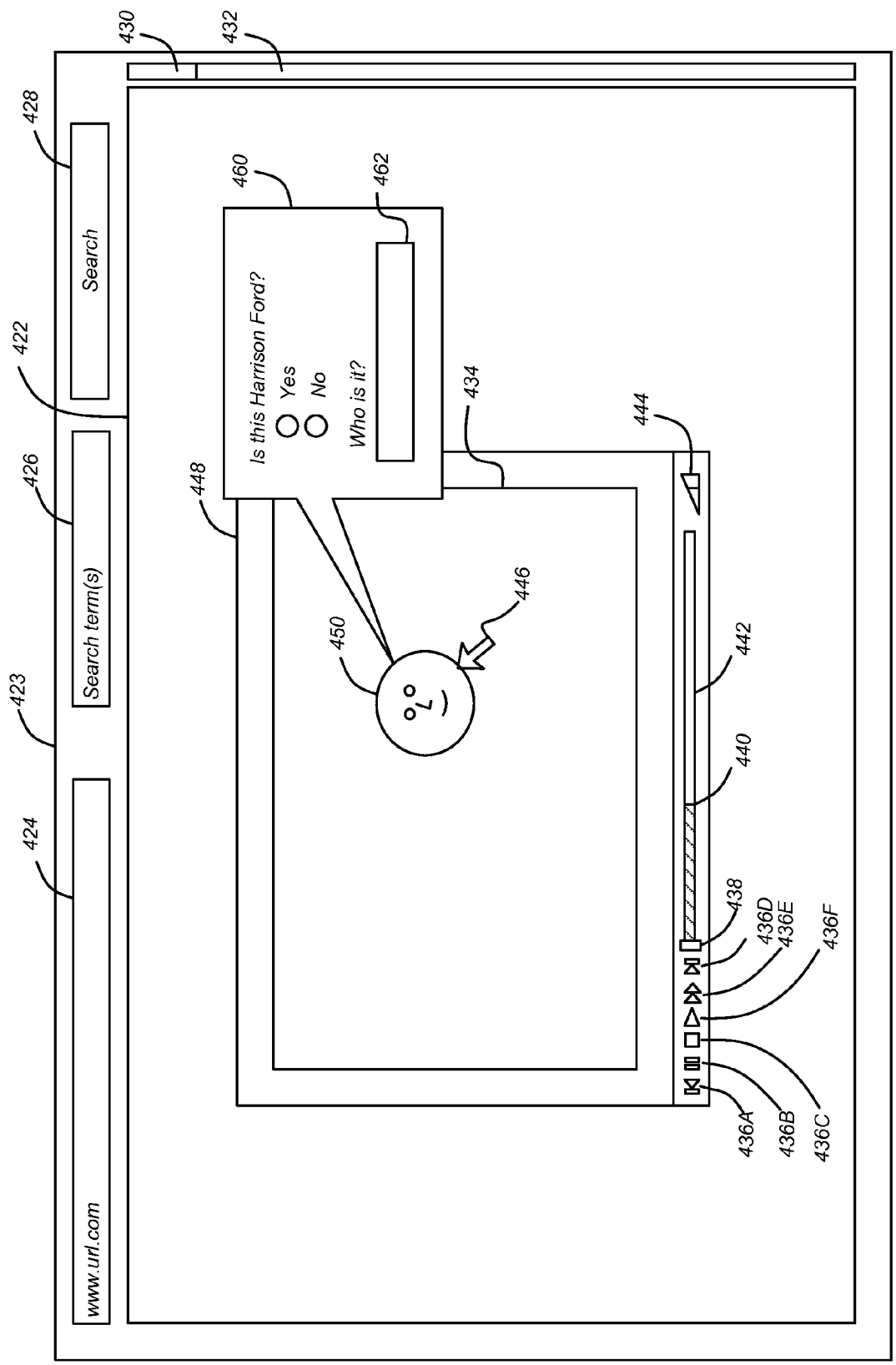
Figure 4F:
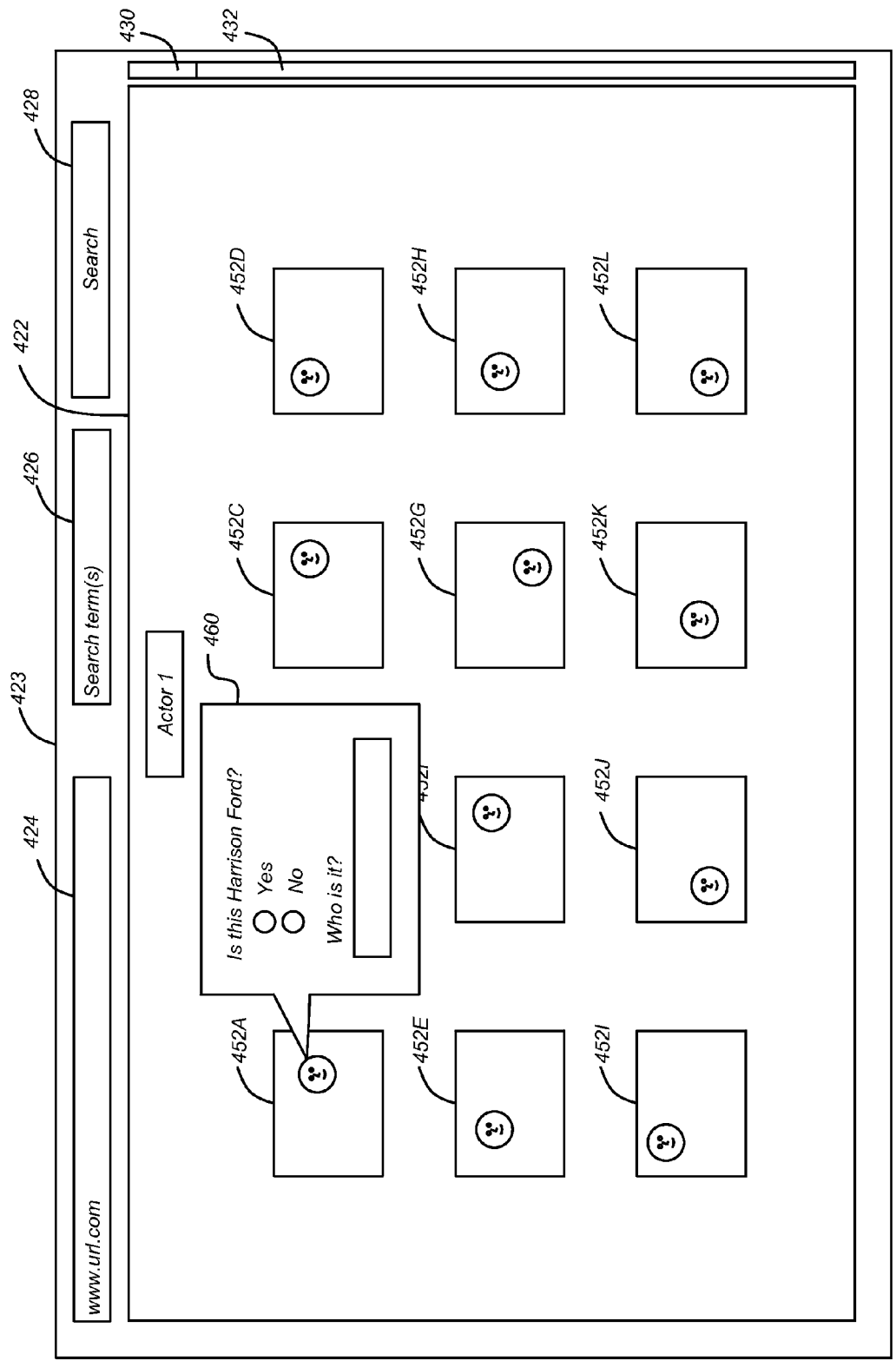
Figure 5:
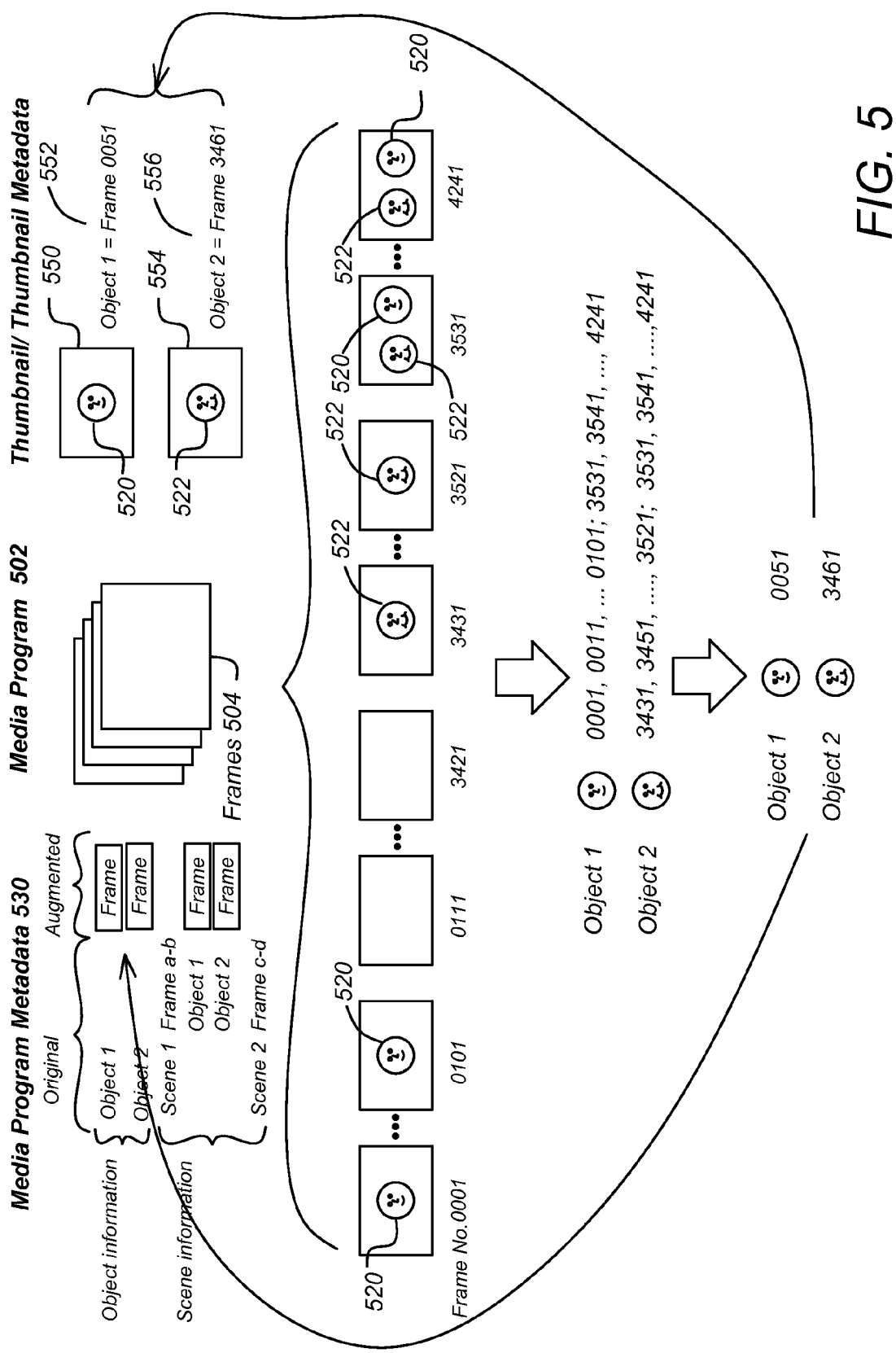
FIG. 5 is a diagram further illustrating the process steps illustrated in FIG. 4.
Figure 6A:
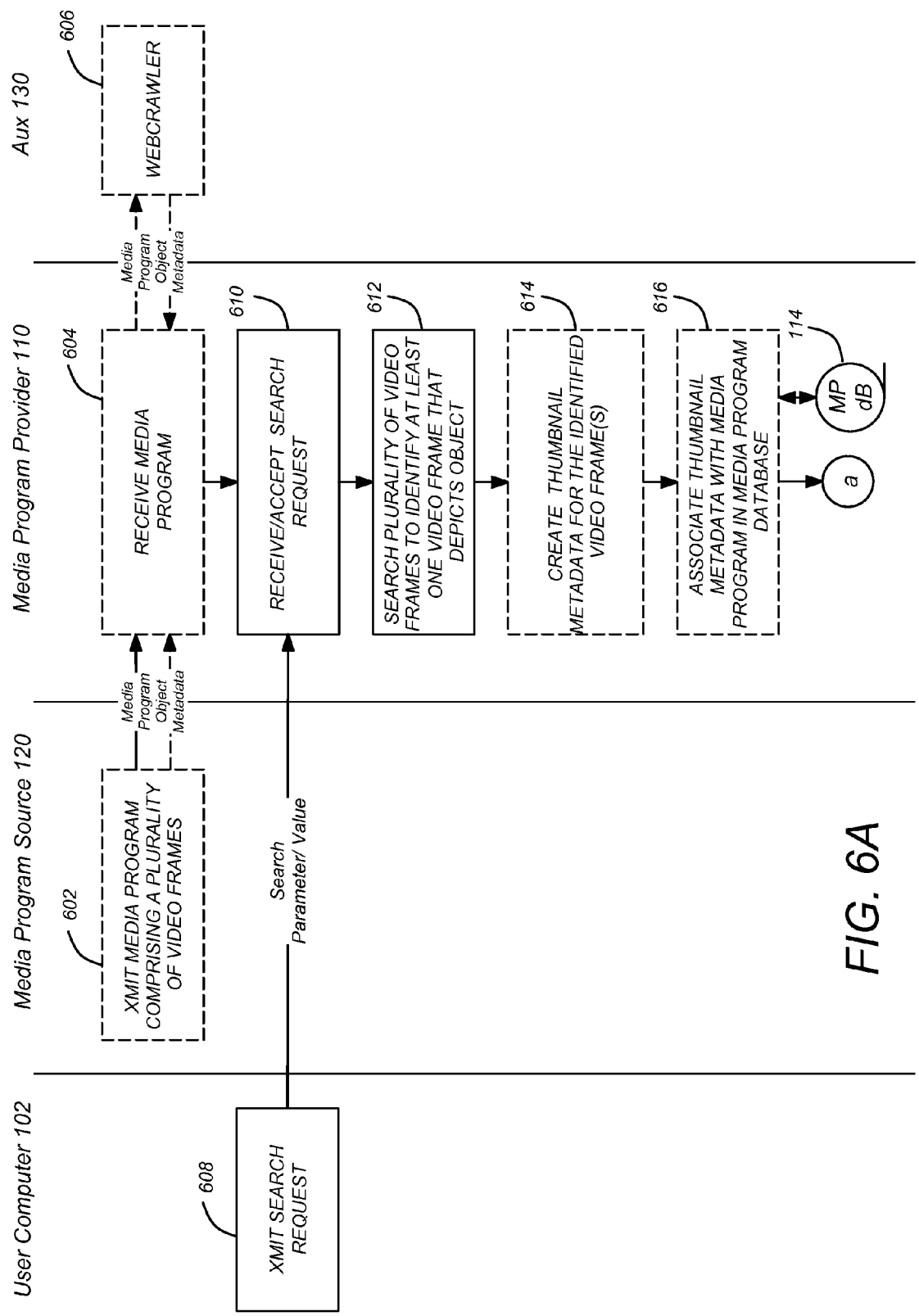

FIGS. 4A-4F are diagrams illustrating exemplary method steps that can be used to develop metadata for a plurality of video frames, and FIG. 5 is a diagram further illustrating the process steps. A plurality of video frames 504 of the media program 502 are extracted from the media program. In one embodiment, the extracted video frames are separated from an adjacent video frame by a fixed time or frame interval. For example, every $10^{th}$ video frame may be extracted.

Turning first to FIG. 4A, object detection is performed on the extracted plurality of video frames to identify frames that depict the object of interest, as shown in block 402. For example, in one embodiment, an algorithm is used to detect human faces, and the objects recognized comprise performer's faces. In the example shown, every $10^{th}$ video frame 504 was extracted from the media program 502. Faces were detected in video frames 0001, 0011, . . . , 0101 (which include a depiction of a first performer's face 520) frames 3431, 3441, . . . , 3521 (which include a depiction of a second performer's face 522), and frames 3531, 3541, . . . , 4241 (which include a depiction of both the first performer's face 520 and the second performer's face 522).

In block 404, first data comprising one or more of the frames of the media program having the detected object is transmitted to the display device 102 for presentation to the user 132.

In one embodiment, the first data comprises the media program (which comprises a plurality of frames that together present moving images of the media program). This data may be reproduced in a media program player executing on the display device 102, as shown in FIG. 4B. In another embodiment, the first data comprises one or more thumbnails presented in response to a media program search or a program guide, as shown in FIG. 4C.

FIG. 4B is a diagram illustrating an exemplary user interface 422 presenting one embodiment of a media program player (MPP) 448 implemented by the user computer 102 and presented on the display 222. In the illustrated embodiment, the MPP 448 is presented in a browser 423. The browser 423 may have an address box 424 where the user may enter the uniform resource locator (URL) of a website of interest. The browser 423 may also accept key words in a search box 426, and upon the selection of search button 428, provide a webpage with search results responsive to the search request to the user. Further, the information presented on the browser 423 may be viewed by using scroll bar 432 by selecting control 430 with the annunciator 446 and moving the control 430 along the scroll bar 432.

In one embodiment, the MPP 448 includes a view window 434 in which the media program is played back to the user, and a plurality of controls 436A-436F (hereinafter alternatively referred to as control(s) 436) which allow the playback of the media program to be controlled by the user. The controls 436 include a stop control 436C that is used to stop the playback of the media program, a play control 436F that is used to begin or resume playback of the media program and a pause control 436B that is used to pause playback of the media program. The controls 436 also include a fast forward control 436E that allow the user to fast forward through the media program, and a forward skip control 416D that allows the user to skip to the next scene or to the next media program. In one embodiment, next scene skipping can be selected by momentarily selecting the skip control 436D, while skipping to the next media program can be performed by selecting and holding the skip control 436D. Different scenes can be identified in the media program by use of markers indicating which frames begin a new scene or by the use of media program metadata identifying the frames for the first frame in each scene. Skip control 436A also allows skipping to the previous media program or scene, in the same way as skip control 436D.

In one embodiment, the MPP 448 may include a progress bar 442 that is rendered proximate the rendered media program in the view window 414. If the media program is progressively downloaded to the MPP 448, the progress bar 422 also may include a media buffer progress indicator 440 to indicate how much of the media program has been transmitted to the user computer 102 and buffered, and hence, how much of the media program might be available for seek previewing. Since streaming video permits the user to obtain access to different portions of the media program without buffering (e.g. through use of control signals transmitted to the media server 110 the media buffer progress indicator 440 is not required.

The control 438 indicates the temporal location of the frames currently being depicted by the MPP 448. The user may command the MPP 448 to replay any portion of the media program via control 438 manipulation by selecting the control 438 and moving the control 438 to a different location along the progress bar 442. Leftmost locations on the progress bar 442 indicate temporal locations near the beginning of the media program, while rightmost locations indicate temporal locations near the end of the media program. FIG. 4B shows the display of an object 450 in the media program.

In one embodiment, the depicted frame of the media program includes a delineation of the detected object, for example, the reticules 454 shown in FIG. 4B. Reticules 454 may surround the object 450 or be proximate the object 450.

FIG. 4D is another diagram illustrating the reproduction of the media program frame having the detected objects. In this embodiment, the user has transmitted a metadata search, attempting to find media programs having Harrison Ford as a performer. This can be accomplished, for example, by entering "Harrison Ford" in the search box. The search result are transmitted to the display device 102 and may include one or more frames presented as thumbnails 452A-452L (hereinafter alternatively referred to as thumbnail(s) 452). The frames include detected objects 450A-450I (hereinafter alternatively referred to as objects 450) and reticules (hereinafter alternatively referred to as reticules 454). Note that although the frames were presented in response to a query for Harrison Ford, the detected objects 450 need not present Harrison Ford. Instead, the detected objects 450 may be other objects.

In one embodiment, any of the frames 452 may depict multiple detected objects. However, in another embodiment, the frames 452 chosen to be provided to the display device are frames in which only one detected object is present.

Returning to FIG. 4A, second data comprising user entered metadata associated with the identified object is received, as shown in block 406. The user-entered metadata may be data identifying the detected object, or any data about the object. For example, if the object is a performer, a uniform resource locator (URL) to the performers webpage may be entered, other media programs in which the performer is a cast member may be entered, or even odd facts about the performer.

In block 408, the object is tracked across proximate frames of the media program. In other words, since objects in media programs are typically depicted in a plurality of adjacent frames, the detected may be tracked from one frame to the next. Typically, the distance the object may move between adjacent frame and the changes in the object appearance from frame to frame, allowing the object to be easily tracked across frames.

In block 410, the metadata entered with respect to the frame displayed to the user is associated with the same object in one or more of the frames proximate the frame displayed to the user. In this way, the user-entered metadata is propagates across a plurality of frames. Typically, since the object can be easily tracked across a group of pictures (GOP).

In block 412, the entered and associated data is stored for later use.

FIG. 4C is a diagram illustrating one embodiment in which the user is prompted to enter object metadata. In block 458, third data comprising a user selection of the detected object is received from the display device 102. In one embodiment, this can be implemented by the user using a pointing device to hover annunciator 446 over the object 454 or to use the annunciator to select the object 450. In block 460, fourth data is transmitted to the display device 102 that comprises an interface for user entry of the metadata associated with the detected object.

FIG. 4E is a diagram showing one embodiment of the user interface 460. The user interface comprises a text box 462 for accepting user input identifying the object. In one embodiment, the user interface 460 also comprises presumptive metadata associated with the second data. For example, if previously entered data indicates that the object might be Harrison Ford, the user interface 460 may include this presumptive data. The user interface 460 may also include a confirmation of this presumptive data, for example, the yes/no choice provided in FIG. 4E.

FIG. 4F is a diagram illustrating the application of the user interface in the thumbnail embodiment.

In one embodiment, user-entered metadata is verified before it is permanently stored in the database and provided to other users. This may be accomplished by comparing the user-entered metadata with other user entered metadata and verifying the user entered metadata based on the comparison. For example, the user-entered data may not be used until a sufficient number or percentage of the user-entered comments agree on the metadata associated with the object. In the case of an identified actor, the user-entered data may not be associated with the object (at least not permanently) until a minimum of five different users have provided data identifying the object, and greater than 80% of the user data agree on the identity of the object.

In the example shown in FIG. 5, an object has been identified as a first performer's face 520 in video frames 0001, and since the face can be tracked to frames 0002, 0011, . . . , 0101, the metadata identifying that object as the performers face is propagated to frames 0002, 0011, . . . , 0101. Also, an object has been identified as the second performer's face 522 in frame 3434, and any metadata entered with respect to frame 3434 can be propagated backwards to frame 3431 and forward to frame 4241 using the tracking feature.

In a further embodiment described below in which the user's search retrieves video clips (instead of static thumbnails) of in which the object is depicted, if the object is depicted in a plurality of sequential frames, an identifier for the first and last frame depicting the object can be noted.

In one embodiment, information identifying the objects depicted in the media program and where (e.g. which frame) they are depicted is stored as augmenting media program metadata 530. In this embodiment, the metadata is associated with the media program instead of an individual frame, and when a user searches for an object in the media program 502, the metadata that indicates the frame(s) in which the object is depicted are retrieved, and a thumbnail is created from that frame, and presented to the user. In embodiments in which a video clip is presented, the metadata may indicate the first and last frame in which the object is depicted, and a thumbnail or video clip (possibly thumbnail sized) is created and presented to the user. In one embodiment, the video clip is activated by rolling the pointer over the thumbnail. In another embodiment, the video clip is activated as soon as it is downloaded, but audio is not played unless the pointer is rolled over the thumbnail or the video clip is otherwise selected. This allows multiple video clips to be portrayed without confusing audio from multiple sources.

In other embodiments, the metadata is associated with the frame in which the object is depicted, or is associated with a thumbnail that is generated from that frame. For example, one or more thumbnails 550, 554 may be generated from the frames depicting the object(s) (520 and 522, respectively), and thumbnail metadata (552 and 556, respectively) is generated describing those frames and the thumbnail metadata is associated with the media program 502. Such metadata can include the frame number, and an information identifying the object(s) depicted in the frame. In this embodiment, when a user searches for an object in the media program, the related thumbnail data is also searched, and the thumbnail depicting the object searched for is presented to the user. Or, the metadata describing objects depicted in a frame 502 of the media program may be simply associated with the frame 502 (instead of a thumbnail created from the frame). In this embodiment, when the user searches for an object in the media program, frame metadata is searched to find frames that depict the object. Thumbnails can then be generated from the found frames.

In yet another embodiment, the metadata does not necessarily describe an object, but rather, can describe a location, or a scene.

FIG. 3B is a diagram illustrating exemplary method steps that can be used to allow users to search the metadata to identify media program frames 504 depicting objects of interest. In block 320, a search request or search query is transmitted from the user computer 102. The search request may comprise a search parameter having a value. The search parameter may be a keyword, object name, or scene. The search request is received or accepted by the media program provider 110, as shown in block 322. In block 324, the media program database 114 is searched to for the search parameter value. In block 326, thumbnails that depict the object described by the parameter value and thus responsive to the search are generated (in embodiments where they are not generated in advance) or retrieved (in embodiments where they are generated in advance). The results are included in a program guide or other interface that is then transmitted to the user computer 102, as shown in block 328. The user computer 102 receives the program guide and displays the thumbnails to the user, as shown in block 330.

The user may then select the thumbnail, as shown in block 322. A message identifying the selected thumbnail or the associated media program is provided to the media program provider 110, which retrieves the media program associated with the thumbnail, as shown in block 334. The user computer 102 receives and displays the selected media program, as shown in block 336.

In embodiments where the media program itself is not streamed by the media program provider but rather by one of the media program sources 120, selection of the thumbnail transmits a message to the media program source 120 identifying the thumbnail or media program to be reproduced, and the media program is provided instead by the media program source 120. Although the media program is provided by the media program source 120 in this instance, the window displaying the media program may be embedded in a window supplied by the media program provider 110, thus providing the same look and feel to the user interface regardless of whether the media program is streamed from the media program provider 110 or the media program source 120.

The operations described in block 324 may be implemented in a number of ways. In one embodiment, the media program metadata 530 is searched to determine if the search parameter value matches information describing an object. If the search parameter value matches media program metadata 530 describing the object, the frame associated with the found value is determined, and used to generate a thumbnail that is later transmitted to the user computer 102 for display. For example, if the search parameter is a performer and the search parameter value is "Meg Ryan", the media program database 114 is searched for the value "Meg Ryan." By virtue of the operations described above, with respect to FIG. 3A, the media program database 114 includes a matching entry for "Meg Ryan" and an associated frame number which indicates which frame an image depicting her likeness can be found.

In another embodiment, the media program database 530 includes thumbnail or frame metadata, and media program database 530 is searched to find an entry (such as an object description) that includes the search parameter value. For example, if the user 132 entered "Meg Ryan" as the search value, the media program database 114 is searched to determine if the media program metadata 530 includes the entry "Meg Ryan." If so, the thumbnails associated with the "Meg Ryan" entry are retrieved from the media program database 530 and transmitted to the user computer 102 for display.

Typically, media programs 502 include a plurality of scenes, and a performer or other object may be depicted in more than one scene. In one embodiment, the media program database 114 includes media program metadata 530 that identifies the scene and the first and last frame of each scene. An example is shown in FIG. 5. In this embodiment, the frame number of the frame(s) depicting the desired object is presented for each of the scenes. For example, the media program metadata may include information organized as follows.

| Scene | Scene Frames | Object | Object Frame(s) |
|---|---|---|---|
| Diner | 3451-6782 | Meg Ryan | 3876 |
| Diner | 3451-6782 | Billy Crystal | 3896 |
| Airplane | 7891-9870 | Meg Ryan | 7932 |

In this embodiment, the user may also enter a search query specifying not only the object of interest, but the scene of interest as well (e.g. "Meg Ryan and Diner"). In this case, the media program database will create and return a thumbnail using frame 3876, since Meg Ryan is depicted in that frame in the diner scene of the movie.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of obtaining metadata associated with a media program, comprising the steps of:
    detecting an object in a frame of the media program;
    transmitting first data comprising the frame of the media program having the object to a display device for presentation to a first user, wherein the first user is viewing the media program through a video delivery service offering delivery of the media program;
    receiving user entered metadata from the first user for the object in the frame;
    tracking the object to determine proximate frames to the frame in which the object appears across the proximate frames of the media program;
    automatically associating the user entered metadata from the first user with the object in the frame with at least one of the proximate frames of the media program in response to receiving the user entered metadata from the first user and the determination of the proximate frames the object appeared across without user input indicating the first user entered metadata should be associated with the object in the proximate frames;
    comparing the user entered metadata from the first user with user entered metadata from second users for the object;
    verifying that the user entered metadata from the first user and the second users should be associated as additional metadata for the object in the media program based on the comparison; and
    upon verifying, associating the user entered metadata for the frame and the at least one of the proximate frames with the media program, wherein the associated user entered metadata is usable to provide a search result identifying the media program, and wherein a thumbnail of one of the frame and the proximate frames that depicts the object is determined from the user-entered metadata and used to identify the media program.

2. The method of claim 1, wherein the step of receiving the user entered metadata from the first user for the object comprises the steps of:
    receiving a first user selection of the object from the display device; and
    transmitting second data comprising an interface to the display device for user entry of the user entered metadata associated with the object.

3. The method of claim 2, wherein the second data comprises the user entered metadata from the second users for the object entered by the second users.

4. The method of claim 2, wherein the second data comprises a presumptive metadata associated with the object and the user entered metadata from the first user comprises a confirmation of the presumptive metadata.

5. The method of claim 1, wherein:
    the frame comprises a delineation of the object.

6. The method of claim 5, wherein the delineation comprises reticules proximate the object.

7. The method of claim 1, wherein the first data comprises a plurality of frames including the transmitted frame, the plurality of frames together presenting moving images of the media program.

8. The method of claim 1, wherein the frame is a thumbnail comprising only one object.

9. The method of claim 8, wherein the thumbnail is transmitted in response to a metadata search, and the frame is selected so as to comprise the one object and no additional objects.

10. The method of claim 9, wherein the metadata search is for a performer depicted in the media program.

11. The method of claim 1, wherein the received user entered metadata from the first user comprises user entered metadata from the first user identifying the object.

12. The method of claim 1, wherein the object is a performer depicted in the media program and the user entered metadata from the first user identifies the performer.

13. The method of claim 1, further comprising storing the user entered metadata from the first user upon verifying the user entered metadata.

14. The method of claim 1, wherein verifying comprises:
    comparing a number of users counted from the first user and the second users that identified the object in the user entered metadata to a threshold; and
    verifying the user entered metadata when the number of users is above the threshold.

15. An apparatus for obtaining metadata associated with a media program, comprising:
 one or more computer processors; and
 a non-transitory computer-readable storage medium comprising instructions, that when executed, control the one or more computer processors to be configured for:
  detecting an object in a frame of the media program and for tracking the object to determine proximate frames to the frame in which the object appears across the proximate frames of the media program;
  transmitting first data comprising the frame of the media program having the object to a display device for presentation to a first user, wherein the first user is viewing the media program through a video delivery service offering delivery of the media program;
  receiving user entered metadata from the first user for the object in the frame;
  automatically associating the user entered metadata from the first user with the object in the frame with at least one of the proximate frames of the media program in response to receiving the user entered metadata from the first user and the determination of the proximate frames the object appeared across without user input indicating the first user entered metadata should be associated with the object in the proximate frames;
  comparing the user entered metadata from the first user with user entered metadata from second users for the object;
  verifying that the user entered metadata from the first user and the second users should be associated as additional metadata for the object in the media program based on the comparison; and
  upon verifying, associating the user entered metadata for the frame and the at least one of the proximate frames with the media program, wherein the associated user entered metadata is usable to provide a search result identifying the media program, and wherein a thumbnail of one of the frame and the proximate frames that depicts the object is determined from the user-entered metadata and used to identify the media program.

16. The apparatus of claim 15, further configured for receiving a user selection of the object from the display device, and transmitting second data comprising an interface to the display device for user entry of the user entered metadata from the first user associated with the object.

17. The apparatus of claim 16, wherein the second data comprises user entered metadata from the second users for the object entered by the second users.

18. The apparatus of claim 16, wherein the second data comprises a presumptive metadata associated with the object and the user entered metadata from the first user comprises a confirmation of the presumptive metadata.

19. The apparatus of claim 15, wherein the frame comprises a delineation of the object.

20. The apparatus of claim 19, wherein the delineation comprises reticules proximate the object.

21. The apparatus of claim 15, wherein the first data comprises a plurality of frames including the transmitted frame, the plurality of frames together presenting moving images of the media program.

22. The apparatus of claim 15, wherein the frame is a thumbnail comprising only one object.

23. The apparatus of claim 22 wherein the thumbnail is transmitted in response to a metadata search, and the frame is selected so as to comprise the one object and no additional objects.

24. The apparatus of claim 23, wherein the metadata search is for a performer depicted in the media program.

25. The apparatus of claim 15, wherein the received user entered metadata from the first user comprises user entered metadata from the first user identifying the object.

26. The apparatus of claim 15, wherein the object is a performer depicted in the media program and the user entered metadata from the first user identifies the performer.

27. The apparatus of claim 15, further configured for storing the user entered metadata from the first user upon verifying the user entered metadata.

28. The apparatus of claim 15, wherein verifying comprises:
 comparing a number of users counted from the first user and the second users that identified the object in the user entered metadata to a threshold; and
 verifying the user entered metadata when the number of users is above the threshold.

29. A non-transitory computer-readable storage medium containing instructions for obtaining metadata associated with a media program, the instructions when executed, control a computer system to be configured for:
 detecting an object in a frame of the media program;
 transmitting first data comprising the frame of the media program having the object to a display device for presentation to a first user, wherein the first user is viewing the media program through a video delivery service offering delivery of the media program;
 receiving user entered metadata from the first user for the object in the frame;
 tracking the object to determine proximate frames to the frame in which the object appears across the proximate frames of the media program;
 automatically associating the user entered metadata from the first user with the object in the frame with at least one of the proximate frames of the media program in response to receiving the user entered metadata from the first user and the determination of the proximate frames the object appeared across without user input indicating the user entered metadata should be associated with the object in the proximate frames;
 comparing the user entered metadata from the first user with user entered metadata from second users for the object;
 verifying that the user entered metadata from the first users and the second users should be associated as additional metadata for the object in the media program based on the comparison; and
 associating the user entered metadata for the frame and the at least one of the proximate frames with the media program, wherein the associated user entered metadata is usable to provide a search result identifying the media program, and wherein a thumbnail of one of the frame and the proximate frames that depicts the object is determined from the user-entered metadata and used to identify the media program.

30. The apparatus of claim 29, wherein the step of receiving the user entered metadata from the first user for the object comprises:
 receiving a user selection of the object from the display device; and
 transmitting second data comprising an interface to the display device for user entry of the user entered metadata from the first user for the object.

31. The apparatus of claim 30, wherein the second data comprises the user entered metadata from the second users for the object entered by the second users.

32. The apparatus of claim 30, wherein the second data comprises a presumptive metadata associated with the object and the user entered metadata from the first user comprises a confirmation of the presumptive metadata.

33. The apparatus of claim 29, wherein the frame comprises a delineation of the object.

34. The apparatus of claim 33, wherein the delineation comprises reticules proximate the object.

35. The apparatus of claim 29, wherein the first data comprises a plurality of frames including the transmitted frame, the plurality of frames together presenting moving images of the media program.

36. The apparatus of claim 29, wherein the frame is a thumbnail comprising only one object.

37. The apparatus of claim 36, wherein the thumbnail is transmitted in response to a metadata search, and the frame is selected so as to comprise the one object and no additional objects.

38. The apparatus of claim 37, wherein the metadata search is for a performer depicted in the media program.

39. The apparatus of claim 29, wherein the received user entered metadata from the first user comprises user entered metadata from the first user identifying the object.

40. The apparatus of claim 29, wherein the object is a performer depicted in the media program and the user entered metadata from the first user identifies the performer.

41. The apparatus of claim 29, further comprising the step of storing the user entered metadata from the first user upon verifying the user entered metadata.

42. The non-transitory computer-readable storage medium of claim 29, wherein verifying comprises:
  comparing a number of users counted from the first user and the second users that identified the object in the user entered metadata to a threshold; and
  verifying the user entered metadata when the number of users is above the threshold.

* * * * *